United States Patent [19]
Olson et al.

[11] 3,918,741
[45] Nov. 11, 1975

[54] DUAL MODE STABILIZER ASSEMBLY

[75] Inventors: John E. Olson; Dennis W. Gaibler, both of Portland, Oreg.

[73] Assignee: Cascade Corporation, Portland, Oreg.

[22] Filed: Apr. 12, 1974

[21] Appl. No.: 460,334

[52] U.S. Cl. .............................. 280/150.5; 212/145
[51] Int. Cl.² .............................................. B60S 9/12
[58] Field of Search .................. 280/150.5; 212/145; 254/124

[56] References Cited
UNITED STATES PATENTS

| | | | |
|---|---|---|---|
| 3,007,717 | 11/1961 | Noly | 212/145 UX |
| 3,262,582 | 7/1966 | Pitman et al. | 280/150.5 X |
| 3,603,614 | 9/1971 | Gauchet | 280/150.5 |
| 3,716,252 | 2/1973 | Johnson | 280/150.5 |
| 3,767,226 | 10/1973 | Stephens | 280/150.5 |

*Primary Examiner*—Leo Friaglia
*Assistant Examiner*—Michael J. Forman
*Attorney, Agent, or Firm*—Kolisch, Hartwell, Dickinson & Stuart

[57] ABSTRACT

An outrigger-type stabilizing support assembly for a truck-mounted loader, including a pair of selectively actuatable, ground-engaging stabilizing members—a swing-out arm and a vertical support post—both powered by a common hydraulic ram.

7 Claims, 4 Drawing Figures

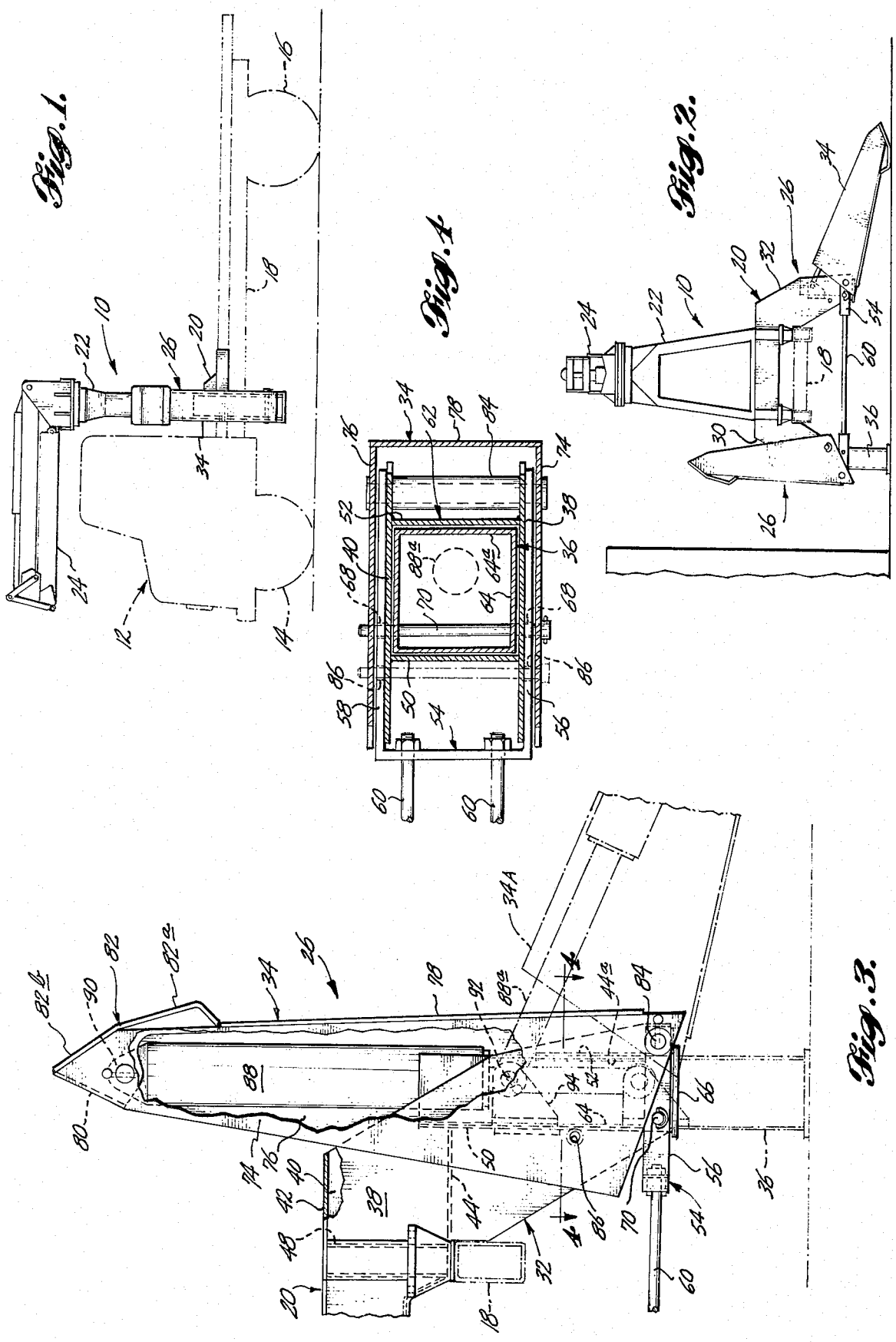

DUAL MODE STABILIZER ASSEMBLY

BACKGROUND AND SUMMARY OF THE INVENTION

The present invention relates generally to vehicle-carried stabilizing supports for mobile equipment, and more particularly to an improved stabilizer assembly including dual, selectively actuatable stabilizing members.

Vehicle-mounted loaders, cranes, backhoes, and the like, conventionally are provided with one or more ground-engageable support structures for stabilizing the vehicle during its use at a worksite. Typically, such a support structure includes an elongate, extensible-retractible member, commonly known as an outrigger, having a ground-engaging pad at one end. In some designs, the outrigger is mounted so that it projects vertically downward when extended, and contacts the ground closely adjacent the vehicle. More usually, the outrigger is mounted to project laterally outward from the vehicle at an oblique angle, so that it engages the ground at a distance from the vehicle for greater stability.

Both types of outrigger mountings have been used satisfactorily in support assemblies for equipment-carrying vehicles, but both have certain drawbacks. Vehicles provided with outward-projecting, angular outrigger mountings cannot be used in relatively close working quarters-next to a wall or a building, for example. Where maximum stability is required, vehicles having vertically extending outriggers may be usable only with greatly reduced loading.

To overcome these drawbacks, it has been proposed to provide a vehicle with adjustably mounted outriggers which can be extended either vertically downward, or angularly outward, as desired. In one prior art arrangement, a ram-actuated extensible-contractible outrigger leg is pivotally mounted on a vehicle, and adapted to be swung in a vertical plane, about its pivot axis, by another hydraulic ram-horizontally disposed. While this arrangement is satisfactory for its intended purpose, the use of two rams and their associated fittings, hoses and linkage adds considerably to the cost of the structure, and to the amount of maintenance required. In another known arrangement, an outrigger comprising an elongate, telescoping structure is pivotally connected to a vehicle frame by releasable pins, which enable the outrigger to be manually positioned and locked in either an oblique or vertical position. While also satisfactory for the intended purpose, manual manipulation of a relatively large, heavy, and unbalanced structure is required to change the mode of outrigger operation.

To overcome these and other drawbacks of prior art designs, the present invention provides a novel dual mode outrigger assembly comprising a pair of selectively actuatable groundengaging stabilizing members-a swing-out arm and a vertical support post--both powered by a single hydraulic ram. In a preferred embodiment of the invention, a swing-out arm is pivotally secured at one end to mounting structure attached to the frame of a vehicle. The other end of the arm is provided with a ground-engaging pad. Thus mounted, the arm is swingable in a vertical plane extending generally transversely of the vehicle's frame between a carrying position, wherein the arm extends generally vertically upward from its mounting point, and a stabilizing position wherein the pad engages the surface of the ground laterally outward of the frame. A vertical support post is slidably received within a vertically disposed matching bore in the mounting structure, substantially in axial alignment with the swing-out arm when the latter is in its carrying position. The lower end of the post is provided with a ground-engaging foot or pad. A dual action hydraulic ram disposed within the swing-out arm is secured at one end adjacent the outer, or pad-bearing, end of the arm. The opposite end of the ram is pivotally secured to the upper end of the support post.

So constructed, the novel outrigger assembly is selectively operable in two different stabilizing modes. If the swing-out arm is locked in its carrying position to the mounting structure, operation of the hydraulic ram lowers or raises the vertical support post. Alternatively, with the support post locked in its carrying position to the mounting structure, operation of the ram moves the swing-out between its carrying and stabilizing positions.

BRIEF DESCRIPTION OF THE DRAWINGS

These and other features and advantages of the novel dual mode outrigger assembly of the invention will become more apparent as the description which follows is read in conjunction with the accompanying drawings, wherein:

FIG. 1 is a side view, in simplified form, of a truck-mounted material loader including dual mode outrigger assemblies (one shown) as contemplated by the present invention;

FIG. 2 is a rear view of the material loader illustrated in FIG. 1, showing outriggers on different sides of the loader extended to different operative, ground-engaging positions;

FIG. 3 is an enlarged view of an outrigger assembly showing details of its construction; and FIG. 4 is a sectional view taken generally along line 4—4 in FIG. 3.

DESCRIPTION OF PREFERRED EMBODIMENT

Referring now to the drawings, and more particularly to FIG. 1 thereof, indicated generally at 10 is a foldable-boom material loader mounted on a truck 12, shown in phantom outline. Truck 12 includes front and rear wheels 14, 16, respectively, supporting the truck for movement over the ground, and a ladder frame 18 extending longitudinally of the truck, supported by the wheels in the usual manner.

Referring to both FIGS. 1 and 2, material loader 10 includes a support frame 20 for the loader, suitably secured to and extending transversely of truck frame 18. A foldable boom 24 is supported on frame 20 by a mast 22. Loader 10 includes a pair of dual mode outrigger assemblies 26 mounted on opposite end portions or wings 30, 32 of support frame 20, laterally outward of truck frame 18 on either side of the vehicle.

As will be understood, outrigger assemblies 26 are used to support or brace loader 10 against lateral tilting about the truck's longitudinal axis. Accordingly, each outrigger assembly includes a swing-out arm 34 adapted for contacting the surface of the ground laterally outward from the sides of truck 12 to provide maximum stability. Such a mode of support is shown at the right side of the loader in FIG. 2, wherein swing-out arm 34 is shown in an extended, ground-contacting position, disposed at the angle shown relative to the ground.

Each outrigger assembly also is provided with a vertical support post adapted for contacting the ground directly beneath the outer end of the support frame. Such a mode of support, desirable when the loader must be used in confined working quarters, is shown at the left side of the loader in FIG. 2, wherein support post 36 is shown extended to a ground-engaging position.

Describing now in greater detail the construction of an outrigger assembly 26, and referring to FIGS. 3 and 4 of the drawings, support frame wing 32 includes a parallel, spaced-apart pair of side plates 38, 40 having the peripheral outline shown in FIG. 3. Extending between the side plates, and suitably joined to them, as by welding, are horizontal plates 42, 44, and vertical plates 48, 50 and 52. Joined to the outer surfaces of side plates 38, 40 along their lower margins are the legs 56, 58, respectively, of a U-shaped bracket 54. Extending beneath frame 18 between bracket 54 and a similar bracket on wing 30 (FIG. 2), and connected to the brackets as shown, are a pair of elongate rods 60.

As best shown in FIG. 4, side plates 38, 40 and vertical plates 50, 52 together form an elongate, vertically disposed, rectangular guide 62 in wing 32. A box-shaped tube 64 comprising vertical support post 36 is telescopically received within guide 62. To adapt post 36 for supportive engagement with the ground, a support plate or pad 66 is suitably fastened to the bottom end of tube 64. Referring to FIG. 3, it will be noted that right hand wall 64a of tube 64 is shorter than the other walls, and has a height essentially equal to that of vertical plate 52. The reason for this will become apparent later on.

Bracket 54, sleeve 62, and tube 64 are provided with a set 68 (FIG. 4) of bores for receiving a releasable pin 70 upon post 36 being fully telescoped into guide 62—the position shown in solid outline in FIG. 3.

Still referring to FIGS. 3 and 4, swing-out arm 34 is an elongate, tapered, hollow structure having a generally U-shaped transverse cross section. Arm 34 includes a pair of parallel, opposed side plates 74, 76, having the angular marginal outline shown in FIG. 3, suitably joined along their right hand margins in the drawings to the lateral edges of an elongate rectangular web 78 extending substantially the length of arm 34 inwardly of its ends. The side plates are similarly joined adjacent their upper, left hand margins by a smaller rectangular reinforcing plate 80 (FIG. 3).

Adapting swing-out arm 34 for engagement with the ground is a support pad 82, fixedly attached, as by welding, at the outer end of the arm. Support pad 82 has the angular side profile shown in FIG. 3, providing a pair of rectangular support faces 82a, 82b disposed at a shallow angle to each other.

Swing-out arm 34 is pivotally connected to wing 32 by a horizontally disposed pivot pin 84 supported between side walls 38, 40 adjacent the outermost portion of wing 32 as shown. An axially aligned set 86 of bores is provided in side walls 38, 40 and side plates 74, 76 for receiving a releasable pin, such as previously mentioned pin 70 when arm 34 is in the upright, carrying position shown in solid outline in FIG. 3.

Disposed within arm 34 is a double-acting fluid motor, or ram, 88 with its cylinder end pivotally connected at 90 adjacent the outer end of the arm. The rod end of ram 88 is pivotally connected at 92 to a bracket 94 which is securely attached along an inner wall, the left hand wall in the figures, of support post 36. Ram 88 is of conventional design and includes the usual fluid inlet/outlets (not shown) adjacent either end. By means of suitable conduits fluid pressure from any suitable source (not shown) on the truck is fed to the opposite ends of ram 88 for selectively extending or retracting its piston rod 88a.

From the foregoing description, it is believed that the operation of outrigger assembly 26 will be readily apparent. With releasable pin 70 received in bore set 68, as shown in solid outline in FIGS. 3 and 4, support post 36 is locked to the support frame. Upon fluid being supplied under pressure to the outer, cylinder end of ram 88, extension of the ram occurs which causes arm 34 to swing outward, to the right in FIGS. 2–4, about the axis of pivot pin 84. With continued extension of the ram, an outwardly projecting angular or stabilizing position 34A, indicated in phantom outline in FIG. 3, is reached, wherein support pad 82 is pressed against the ground laterally outward of vehicle frame 18, as shown in FIG. 2. It will be understood that the angular inclination of the swing-out arm in its extended, stabilizing position will vary depending on the hardness of the ground, irregularities in the terrain, etc. Accordingly, either or both of support faces 82a, 82b may be in contact with the ground when a stabilizing position is reached.

Alternatively, with releasable pin 70 received in bore set 86, arm 34 is locked to the support frame. Then, upon extension of ram 88, support post 36 will be projected vertically downward to a stabilizing position wherein pad 66 is pressed against the ground, the position in phantom outline at 36A and at the left in FIG. 2.

In either mode of operation, the stabilizing member is retracted from ground contact to its carrying position by feeding fluid under pressure to the rod end of the ram.

The disclosed construction provides obvious advantages over prior art designs in that, after a vehicle is in place at a worksite, either of the above-described modes of stabilization may be selected merely by placing the releasable pin in the appropriate set of bores prior to actuation of the ram. Moreover, the construction of the novel outrigger assembly is relatively simple and requires only one hydraulic ram for each unit. This provides economy of manufacture, and simplifies both servicing and maintenance.

While a particular embodiment of the invention has been described, it should be obvious that the invention is subject to variations and modifications such as would be apparent to one skilled in the art, and that such variations and modifications are included within the scope of the invention as claimed.

It is claimed and desired to secure by Letters Patent:

1. A dual mode stabilizer assembly for a ground-supported vehicle having a frame, comprising p1 a support structure mounted on said frame, ground-engaging means mounted on said support structure at one side of said frame and operable in a pair of alternatively selectable ground-engaging modes, said ground-engaging means including a first member for engaging the ground at one location relative to said side of the frame upon operation in one of said modes, and a second member for engaging the ground at another location toward said side of the frame from said one location upon operation in the other of said modes, means for selecting the operating mode of said ground-engaging means, comprising means for selective, alternative locking of said first and second members against movement relative to said frame, and common powering means operatively connected to both of said members for shifting the unlocked one of the same into engagement with the ground according to the selected operating mode.

2. The stabilizer of claim 1, wherein said powering means comprises an extensible-contractible fluid motor connected adjacent its opposite ends to said members.

3. A stabilizer assembly for a ground-supported vehicle having a frame, in operative condition comprising a pair of stabilizing members, each including a ground-engaging pad, mounting means mounting said members on the frame for movement relative thereto and to each other, one of said pair of stabilizing members being mounted for pivotal movement in a substantially vertical plane, and the other being mounted for linear movement in a substantially vertical direction, powering means comprising an extensible-contractible motor operatively interconnecting said members for producing said movement relative to the frame and to each other, and means for selective, alternative locking of said members against movement relative to the frame, whereby, with one element so locked, the other is moved into and out of engagement with the ground with actuation of said motor.

4. In combination with a ground-supported vehicle having a frame, a stabilizer assembly for said vehicle comprising a support structure secured to the vehicle's frame, a first elongate stabilizing member having a ground-engaging pad adjacent one end thereof, means pivotally joining the opposite end of said first member to the support structure and enabling swinging of said member in a substantially vertical plane to shift its ground-engaging pad into and out of contact with the ground at a point laterally outward of said frame, a second elongate stabilizing member having a ground-engaging pad adjacent one end thereof, means mounting said second member on said support structure and enabling linear movement relative thereto in a substantially vertical direction to shift its ground-engaging pad into and out of contact with the ground at a point laterally inward of said first-mentioned point, means for selective, alternative locking of said first and second members to said support structure, and an extensible-contractible motor operatively interconnecting said first and second members and acting on the unlocked one of said members to move it relative to said support structure and shift its ground-engaging pad into and out of contact with the ground.

5. A stabilizer assembly for a ground-supported vehicle having a frame, comprising a support structure secured to said frame and including a portion extending laterally outward from the frame, an elongate arm having a ground-engaging pad adjacent one end thereof, means pivotally securing the arm adjacent its opposite end to said portion of the support structure and enabling swinging of the arm in a substantially vertical plane between a carrying position wherein the arm extends generally upward from its mounting point and a stabilizing position wherein its pad engages the ground laterally outward of said frame, an elongate post having a ground-engaging pad adjacent one end thereof, means in said support structure portion defining an elongate guide receiving said post and enabling reciprocal linear movement of the post relative thereto between a carrying position wherein the post is elevated above the ground and a stabilizing position wherein its pad engages the ground beneath said structure portion, means for selective, alternative locking of said arm and post in their respective carrying positions, and linearly extensible-contractible motor means operatively interconnecting said arm and post, actuation of said motor means effecting movement of the unlocked one of said arm and post between its respective carrying and stabilizing positions.

6. The stabilizer assembly of claim 5, wherein said motor means comprises a hydraulic ram disposed within said arm, pivotally secured at one of its ends adjacent the pad-bearing end of the arm and at the other of its ends to the upper end of said post.

7. The stabilizer assembly of claim 5, wherein said locking means comprises means defining a first set of bores in said arm and support structure disposed whereby, with said arm in its carrying position, said bores are axially aligned, means defining a second set of bores in said post and support structure disposed whereby, with said post in its carrying position, said bores are axially aligned, and a pin releasably received in an aligned set of said bores.

* * * * *